3,313,797
STABILIZED FIBER-REACTIVE DYES

Erik Kissa, Wilmington, Del., assignor to E. I. du Pont de Nemours and Company, Wilmington, Del., a corporation of Delaware
No Drawing. Filed Jan. 17, 1963, Ser. No. 252,056
11 Claims. (Cl. 260—146)

This invention relates to fiber-reactive dye compositions which have been stabilized against hydrolysis during their manufacture and storage. It also relates to a method for stabilizing such compositions.

In the dyeing of cellulose textile materials, such as cotton, it is a common practice to use a dye which reacts with one or more hydroxyl groups of the cellulose molecule and as a result, the dye is chemically attached to the material being dyed. Dyes of this nature are known as fiber-reactive dyes, and several different types of such dyes are described in the prior art. The present invention is concerned with a class of fiber-reactive dyes which are conveniently referred to as quinoxaline dyes or quinoxaline-type dyes. These dyes have the following formula:

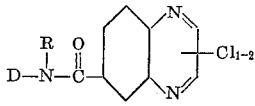

wherein D—NR— is a radical of a dye chromophore having an acylatable amino group —NR— in which R is hydrogen, alkyl, 2-hydroxyethyl, 2-cyanoethyl, or 2-sulfatoethyl.

In a more particular definition of these dyes, D is a water-soluble dye chromophore selected from the group consisting of azo, metallized azo, anthraquinone, and phthalocyanine dye chromophores which is attached to the N-atom by cyclic substitution, and R is selected from the group consisting of hydrogen, lower alkyl, 2-hydroxyethyl, 2-cyanoethyl, and 2-sulfatoethyl.

It will be seen from the above formula that the dyes used in this invention contain a quinoxaline carbonyl group and that the quinoxaline ring is substituted in the 2- or the 3-position or both with chlorine atoms. It is the reactivity of these chlorine atoms that makes the dyes fiber reactive. When a fiber containing hydroxyl or amino groups is contacted with a solution or a dispersion of the dye in the presence of alkali, a chemical reaction occurs to bond the dye to the fiber with the liberation of HCl. The quinoxaline type dyes are highly useful products. However, they also have the undesirable characteristic of being susceptible to hydrolysis. These dyes have a tendency to undergo reaction with water during manufacture and/or storage, whereupon the fiber reactivity of the dye is diminished or completely destroyed by the removal of the fiber-reactive chlorine atoms from the dye molecule. Hydrolysis will take place very readily, even at room temperature, if water is present and conditions are on either the acidic or the alkaline side. When conditions are at or near the neutral point, reaction with water is slower in initiating. However, the problem of hydrolysis still exists. HCl is a by-product of hydrolysis, and this acid has a catalytic effect upon the reaction. Therefore, once hydrolysis is initiated, it is autocatalyzed to a rapid reaction rate, and if sufficient water is present fiber reactivity is destroyed in a very short time. The problem of hydrolysis is further complicated by the fact that it is virtually impossible to keep the quinoxaline dyes out of contact with water. Water is invariably used in their manufacture, and it is invariably present in the finished dye product. In fact, as will be seen from the working examples which appear hereinafter, such dyes may contain more than 10% water when they are in the form of a free-flowing powder. Therefore, the problem of preventing hydrolysis of the dye exists from the time the chloroquinoxaline group is introduced into the molecule until the time when the dye is finally applied to the textile material.

This problem of stabilizing quinoxaline-type fiber-reactive dyes against hydrolysis is one of obtaining sufficient stability against reaction with water while not interfering with the dye's ability to react with the fiber, The dyes are usually applied in the presence of alkali, and since the reaction with the fiber is somewhat analogous to reaction with water, the production of a dye composition which is stable against hydrolysis at a high pH is considered impractical since this would be likely to interfere with the reaction with the fiber. For these reasons, a need exists for a means for stabilizing quinoxaline fiber-reactive dyes against hydrolysis during manufacture and storage, and at the same time permitting the dye to be reactive with the fiber when used for dyeing.

The present invention provides novel quinoxaline dye compositions which have been stabilized against hydrolysis. These compositions comprise fiber-reactive dye solids having the formula previously shown and as a stabilizer against hydrolysis of said dye solids a sulfate salt selected from the group consisting of alkali metal and ammonium sulfates in an amount sufficient to provide at least 3% of sulfate ions based on the weight of dye solids. Such compositions may be in the form of a free-flowing powder, or alternatively they may be in the form of an aqueous paste. In the case of dye pastes, there is, of course, considerable water present, but it is never enough to cause the paste to lose the characteristics of a semi-solid or to have a significant amount of free liquid present. Usually the water content of paste does not exceed 900 wt. percent of the solids present. Such pastes as well as the free-flowing powders which may contain smaller amounts of water, can be stabilized for long periods of time and under a wide variety of pH conditions ranging up to about 8.5. Thus, stabilization is obtained in a pH range suitable for handling and storage of the dyes, and at the same time there is no interference with the fiber-reactivity. Such dye compositions can be readily reacted in the presence of alkali with fibers containing hydroxyl or amino groups.

The sulfate salts which are useful in this invention for the introduction of sulfate ions into the dye composition are the alkali metal and ammonium sulfates, and they include lithium sulfate, sodium sulfate, potassium sulfate, ammonium sulfate, hydrated forms of these salts, such as Glauber's salt ($Na_2SO_4 \cdot 10H_2O$), and mixed salts, such as potassium sodium sulfate. The upper limit on the amount is not critical since the salt will act merely as a diluent for the dye composition. It is also within the scope of this invention to form the sulfate ion in situ. One skilled in the art readily recognizes that this can be accomplished by the introduction into the dye composition of a compound containing the bisulfate ion together with an alkali such as sodium bicarbonate. Both the sulfate and bisulfate ions may be present in the novel dye compositions. The dye compositions of this invention may also contain diluents or other dyes. The nature of extraneous materials which may be present with the dye is not critical so long as they are substantially chemically inert in the composition. For example, the composition should not contain a material which would render the composition highly alkaline, say, above a pH of about 8.5 when the dye composition is slurried or dissolved in 10 parts by weight of water. One skilled in the art will readily recognize that such materials are not conventional for a quinoxaline dye composition which is being prepared for use at some future time.

The introduction of the $SO_4$ ion to stabilize the chlorines on the quinoxaline ring can be effected at any number of stages in the manufacture of the dye. For example, it may be introduced into the reaction mixture during the preparation of the dye base or into the reaction mixture which is used to condense the quinoxaline ring to the D—NR— group. In such instances, the sulfate ions will act to stabilize the chloroquinoxaline group during manufacture. The sulfate can also be added by salting the dye out of solution with the sulfate salt, either alone or in admixture with other well-known salts which are used to salt dyes out of solution. Alternatively, the sulfate ions may be incorporated with the quinoxaline dye by washing the dye when it is in the form of a wet press cake with a solution of the sulfate. Any of these methods will provide sulfate ions for stabilizing the finished dye compositions, and one skilled in the art can readily determine after a few trial runs the quantity of sulfate which must be used in a given operating procedure to provide the required amount of sulfate in the final dye composition. Another method for incorporating the sulfate ion with the quinoxaline dye is by intimate mixing of the two materials in dry solid form or while the dye is in the form of a paste. Mixing can be accomplished by grinding or milling or by any other conventional means which produces an intimate mixture. This procedure is convenient if the isolation (filtration rate, etc.) of a particular dye is slow in the presence of sulfate ions.

A preferred procedure to produce compositions of the present invention is to salt the dye out of an aqueous medium and then to separate the dye from the liquid medium and dry. In this procedure, the pH of the aqueous medium is adjusted to about 4 to 8.5, and preferably to about 5.5–8, prior to the separation of the dye from the medium, and after separation of the dye solids they are dried in the presence of a sulfate selected from the group consisting of alkali metal and ammonium sulfates in an amount sufficient to provide at least 3% of sulfate ions based on the weight of dye solids. The presence of the sulfate ion during drying is advantageous since the danger of hydrolysis is minimized.

As in the case of most reactions, the rate of hydrolysis of the reactive chlorine on the quinoxaline ring is temperature dependent. The higher the temperature, the faster the rate of hydrolysis. In many instances, the dye or dye intermediate containing the chloroquinoxaline group may be relatively stable to hydrolysis at a pH of about 7 below 40° C. without the presence of sulfate ions. However, the presence of the sulfate ions is necessary because elevated temperature may be encountered during manufacture or storage of the dye. A good example of the use of elevated temperatures during manufacture is in the drying step which is used to remove water from the dye filter cake. It has been found that the dye may be dried at a much higher temperature (as in spray drying at 100° C. or above) without substantial hydrolysis if the sulfate ion is present. Thus, the present invention provides for a much faster and more economical method for producing quinoxaline fiber-reactive dyes.

For a clearer understanding of the invention, the following specific examples are given. These examples are intended to be merely illustrative of the invention and not in limitation thereof.

EXAMPLE I 42 parts of an azo-dye base having the following formula

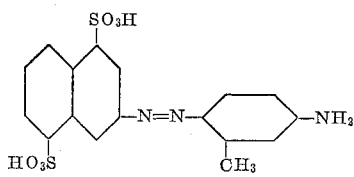

are dissolved in 700 parts of water at 40° C. to give a yellow solution. After adjusting the pH to 7.5–8 (using sodium carbonate), 30 parts of finely powdered, 2,3-dichloro-6-quinoxalinecarbonyl chloride are added, and the mixture is stirred overnight while maintaining a temperature of 35°–40° C. and a pH of 7.5–8 by the addition of sodium carbonate. The yellow solution is then clarified by filtration, salted with 10 parts of sodium sulfate, and the precipitated solid is filtered and washed with a 12% sodium sulfate solution. The filter cake is pressed to 58% dye content, and dried as a thin layer in an oven at 80° C. for 24 hours. The dried product is then ground to a free-flowing light-yellow powder. This powder contains approximately 82% dye, 11% water, and 7% $Na_2SO_4$ by weight. The dye has the formula

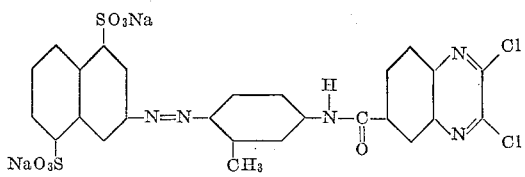

When the dye powder of this example is applied to cotton fabric as follows:
 pad 20 parts of dye, 5 parts NaOH in 1000 parts of water at 30°–40° C., heat for 90 sec. at 325° F.

there results a yellow dyeing of at least 95% fixation, that exhibits excellent fastness to light and washing. When sodium chloride is used in place of sodium sulfate in this example, the rate of hydrolysis is such at 80° C. that it is virtually impossible to dry at this temperature. It is usually necessary to dye such a dye at 40° C. or below under vacuum to prevent deleterious hydrolysis.

A dye of similar shade and dyeing properties is obtained when one replaces the dichloro-6-quinoxalinecarbonyl chloride with an equal molar amount of 3-chloro-6-quinoxalinecarbonyl chloride.

When one replaces the 12% sodium sulfate wash solution in the present example with 6.5% sodium sulfate solution, there results a hydrolytically stable dye powder of the composition 11% water, 4% sodium sulfate, and 85% dye. This amount of sodium sulfate in the final product represents 4.7% (4/85) sodium sulfate based on weight of dye solids or 3.2% $SO_4^=$ ion on the same basis (4.7×96/142).

EXAMPLE II

To 120 parts of 2,4-diaminobenzenesulfonic acid in 1000 parts of water at 35° C. and pH 7.5–8 (maintained using dilute sodium hydroxide solution) are added 163 parts of finely powdered 2,3-dichloro-6-quinoxalinecarbonyl chloride. The slurry is maintained for 4 hours at 35–40° C. and pH 7.5–8.0 and the precipitated solid is filtered. This solid is dissolved in 10,000 parts of 50° C. water, clarified, cooled to 5°–10° C., and slowly added to a solution consisting of 150 parts of 10 N sulfuric acid, 110 parts of 5 N sodium nitrite and 500 parts of water. After completion of the addition, the reaction is stirred at 5°–15° C. for 4 hours, the excess nitrite is destroyed by the addition of sulfamic acid, as shown by a negative test on starch iodide paper, the solid is allowed to settle, and about 10,000 parts of the water layer are removed by decanting.

To the remaining slurry is added a solution consisting of 161 parts of 1-(2′,5′-dichloro-4′-sulfophenyl)-3-methyl-5-pyrazolone dissolved in 450 parts of water at pH 7.0 (obtained by adding sodium hydroxide as necessary) and this bright yellow slurry is stirred at pH 4.5–6 (adding sodium acetate as needed) to effect complete solution. The pH of the brown yellow solution is adjusted to 8.2 with sodium hydroxide, the temperature is increased to 40°–45° C., and sodium sulfate is slowly added to salt the solution. The precipitated yellow solid is filtered, washed with 20% sodium sulfate solution, and dried at 60° C. The dye thus obtained has the formula:

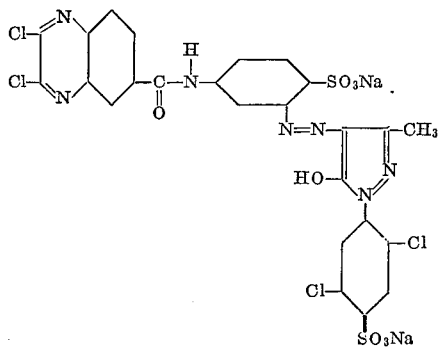

This dye powder is standardized to 65% active ingredient with Glauber's salt and ground. The dye is analyzed for sulfate ion, water and azo nitrogen, and the results are calculated in terms of dye, water and sodium sulfate decahydrate to give the following composition: 65% dye, 10% water, and 25% sodium sulfate decahydrate (Glauber's salt) by weight. The dye powder thus obtained has excellent storage stability. This dye, when exhausted onto cotton with sodium carbonate and sodium sulfate from long volumes at 130° F., affords dyeings in high fixation yields. The bright greenish yellow shades are fast to light and washing.

When it is desired to store the reactive condensation products of 2,3-dichloro-6-quinoxalinecarbonyl chloride with aryldiamines as prepared in the present example, these are isolated by filtration from their aqueous reaction masses to which have been added 100 parts of sodium sulfate.

EXAMPLE III

To 500 parts of water are added 188 parts of 2,4-diaminobenzenesulfonic acid and 100 parts of 30% sodium hydroxide. This slurry is stirred to effect solution, cooled to 25° C., and diluted with 1400 parts of water. To this solution are added all at once 112 parts of acetic anhydride and stirring is continued 1 hour, after which the pH is adjusted to 8±0.5, and 69 parts of a 31% sodium nitrite solution are added. This solution is then added, over ½ hour, to a solution of 500 parts of water, 500 parts of ice, and 120 parts of 30% hydrochloric acid. The resulting slurry is stirred for ½ hour before the excess nitrite is destroyed with sulfamic acid as shown by a negative test on starch iodide paper. This diazo slurry is added with stirring at 5°–15° C. over 1 hour to a solution of 500 parts of water, 323 parts of 1-(2',5'-dichloro-4'-sulfophenyl)-3-methyl-5-pyrazolone, 72 parts of 30% sodium hydroxide, 100 parts of sodium acetate, and 500 parts of ice. To this yellow-brown solution are added 120 parts of hydrochloric acid, the temperature is then raised to 90° C. over 1 hour, held at this temperature for 2 hours, cooled to 40° C., and the precipitated solid dye-base is collected by filtration and washed with a dilute hydrochloric acid solution.

This wet dye-base cake is dissolved in a solution of 5000 parts of water and 165 parts of sodium hydroxide. To this rapidly-stirred solution at 30°–35° C. are added 230 parts of 2,3-dichloro-6-quinoxalinecarbonyl chloride dissolved in 700 parts of xylene. This mixture is stirred for 3 hours at 35°–40° C., while maintaining the pH at 5.5–8.0 by the addition of a sodium hydroxide solution. The reaction mass is then clarified by filtration, 150 parts of potassium chloride in 2000 parts of water are added over 1 hour, and the precipitated, insoluble (in cold water, slightly soluble in boiling water) potassium salt of the formula:

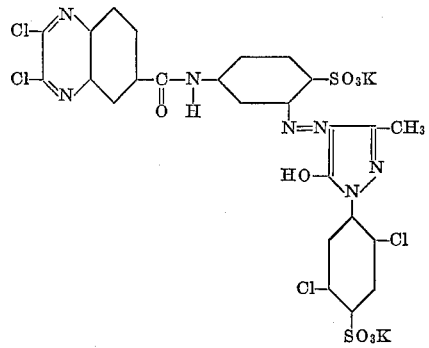

is filtered. This wet press cake is prepared for commercial use either by (a) drying below 60° C. in an oven, adding 4.2% potassium sulfate anhydrous based on weight of dye and grinding,
(b) diluting to 10–50% dye solids with water, adding 8% potassium sulfate anhydrous based on weight of dye and milling. This hydrolytically stable paste (dispersion) of the insoluble potassium salt can be applied to cotton by the well-known pad-steam, exhaust, thermal and printing methods.
(c) adding 12% potassium sulfate based on weight of dye, drying below 100° C., and grinding.

EXAMPLE IV 26 parts of 2,3-dichloro-6-quinoxalinecarbonyl chloride dissolved in 70 parts of xylene are added to a rapidly stirred solution of 37.5 parts of H acid (8-amino-1-naphthol-3,6-disulfonic acid) at pH 6 (adjusted with sodium hydroxide in 400 parts of 35° C. water. The mixture, which converts to a greenish gel, is stirred at 25°–35° C. and at pH 4–5 (maintained with sodium hydroxide) for 3–4 hours. 720 parts of water are added and the pH is adjusted to 8.5±0.2 with sodium hydroxide. The reaction mass is then clarified by filtration and the filtrate is cooled to 5°–15° C. To this brownish solution is added at 5°–15° C. and at pH 7.5±0.2 (maintained with sodium hydroxide) over a 1-hour period the cold diazo slurry prepared in the usual manner from 130 parts of water, 22.5 parts of orthanilic acid, 5.9 parts of hydrochloric acid, 9.0 parts of sodium nitrite and 100 parts of ice. This coupling requires 2–3 hours. The red dye of the structure

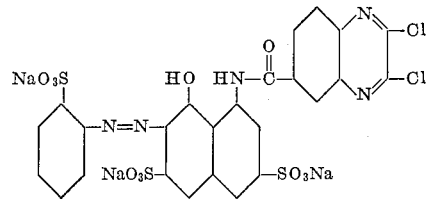

is salted to 10% by volume with solid sodium sulfate over a 2-hour period, filtered, washed with 10% sodium sulfate solution, dried below 100° C. in an oven, and standardized to 65% active ingredient by intimate mixing with sodium sulfate.

When potassium, ammonium, or lithium sulfate is used in place of the sodium sulfate, an equally stable form of this dye is obtained. However, if sodium chloride is used in place of sodium sulfate, the dye must be dried below 40° C. to avoid hydrolysis of the reactive chlorine atoms.

Also, when a 50% paste of the sodium chloride preparation at pH 1.5 is divided into two equal portions and 10% sodium sulfate, based on weight of dye, is added to one portion, it is found that on heating both portions at 80° C. for 66 hours, only 4% of the dye in the portion containing the sulfate has hydrolyzed, whereas 21% of the dye in the portion containing no sulfate has hydrolyzed.

When it is desired to store the reactive condensation products of chloroquinoxaline-6-carbonyl chlorides and azo dye coupling components, made according to the condensation process of this example, these may be stabilized by salting with 110 parts of $Na_2SO_4$, filtering, and optionally drying.

EXAMPLE V 50.3 parts of the azo-dye base

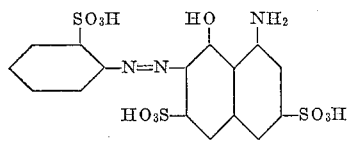

(prepared by coupling acetyl H acid with orthanilic acid followed by hydrolysis) are dissolved in 1100 parts of water at pH 7-7.5 (using sodium hydroxide) and 24.8 parts of 2-chloro-6-quinoxalinecarbonyl chloride dissolved in 80 parts of xylene are added. The resulting mixture is vigorously stirred at pH 6-8 (maintained with sodium hydroxide) and at 35°±5° C. for 3 hours, clarified, salted with sodium sulfate and isolated as in Example IV to give the dye of formula:

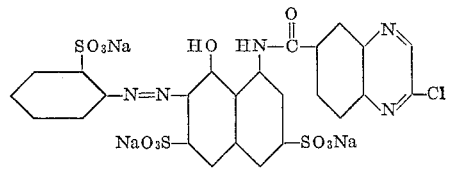

In place of drying the wet cake, which contains 10% color by weight, it is milled to provide a hydrolytically stable dye paste which has all of the desirable dyeing properties of the dry powder. The dry paste contains 10% by weight of $SO_4$ ion based on dye weight.

EXAMPLE VI 25 parts of the dye base

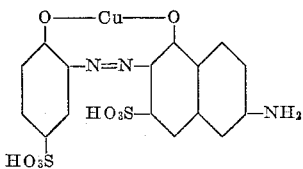

prepared by treating the azo coupling product of 2-amino-1-phenol-4-sulfonic acid and J acid (6-amino-1-naphthol-3-sulfonic acid) with a copper-containing agent, are dissolved at 40±5° C. in 1000 parts of water at pH 7.5 (maintained with sodium hydroxide), and 14.3 parts of 2,3-dichloro-6-quinoxalinecarbonyl chloride dissolved in 45 parts of xylene are added. The resulting mixture is vigorously stirred at pH 7.5-8 (maintained with sodium hydroxide solution) and at 40±5° C. for about 3 hrs., then filtered, and the filtrate is salted with a mixture of 60 parts of sodium sulfate and 60 parts of sodium chloride. The precipitated rubine dye of the structure

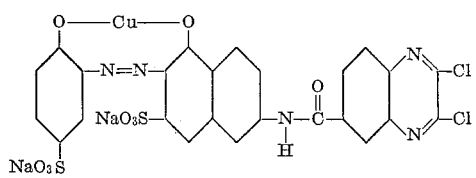

is filtered off and washed with 300 parts of a 15% sodium sulfate solution. The filter cake is pressed to about 30% dye content and dried at 80° C. When ground, this composition is a free-flowing powder which contains (when analyzed and calculated as in Example II) approximately 52.5% dye, 5.5% water, and 42% sodium sulfate decahydrate by weight.

When an aqueous solution of this rubine dye is padded onto cellulosic textile fabric, the fabric dried, passed through a 95°-100° C. bath of sodium chloride and sodium hydroxide for 7 seconds and scoured, about 85% of the dye is fixed to the fabric. The resulting rubine shade is fast to light and washing.

When lithium sulfate or potassium sulfate is used in place of sodium sulfate in the above example, there result dyes of similar stability. Likewise, when 2- or 3-chloro-6-quinoxalinecarbonyl chloride is used in place of the dichloro derivative, a dye of the same properties results.

EXAMPLE VII 160 parts of water are stirred with 29 parts of sodium bicarbonate and 22.3 parts of 5-amino-2-ethylaminobenzenesulfonic acid at 60° C. for 15 minutes and cooled to 40° C. At this temperature are added 0.9 part of cupric sulfate, 0.4 part of copper powder, and, slowly over a 2-hour period, 39.8 parts of the sodium salt of bromamine acid (1-amino-4-bromo-2-anthraquinonesulfonic acid). The blue slurry is stirred for an additional 2 hours, clarified, and then salted carefully to a 14% salt solution, using sodium chloride. The precipitated needles are filtered, washed free of the green-brown color with 15% sodium chloride solution, and redissolved at 30°-35° C. in 1500 parts of water at pH 7.6±0.2 (using sodium hydroxide). To this solution are added 60 parts of xylene containing 24.2 parts of 2,3-dichloro-6-quinoxalinecarbonyl chloride, and the pH and temperature are maintained at 5.5-8 (with sodium hydroxide) and 30°-35° C., respectively, until the pH is steady (usually 3 hours). The solution is clarified by filtration and the filtrate is slowly salted to 4% with sodium chloride and 6% with sodium sulfate, which affords, after stirring for 14 hours, a blue crystalline precipitate. The product of the structure

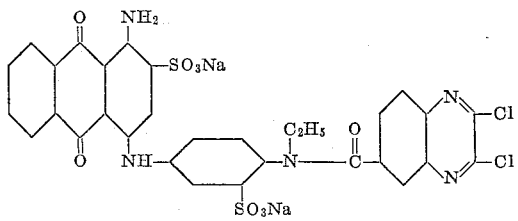

is filtered, washed with a solution of 4% sodium chloride and 10% sodium sulfate, and dried at 100° C.

If the sodium sulfate is omitted, there results a blue dye powder (containing NaCl) which possesses poor hydrolytic stability during drying and storage. For instance, 3 months' storage of these powders at 70° C. affords 7% and 98% hydrolysis for the sulfate and chloride preparations, respectively.

EXAMPLE VIII

To 160 parts of chlorosulfonic acid cooled to 5° C. are added 23 parts of copper phthalocyanine at such a rate as not to exceed 25° C. This slurry is stirred 15 minutes, heated over 1.5 hours to 135±5° C. and stirred at this temperature for 3.5 hours. The dark green solution is cooled to room temperature and is drowned in a mixture of ice and water below 5° C. The solid, which is collected by filtration and washed with 5° C. aqueous 1% hydrochloric acid solution, corresponds to a mixture of compounds of the structure

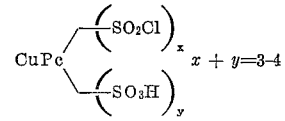

in which all substituents modified by $x$ and $y$ are primarily located in the 3, 3', 3'', and 3''' positions.

To this wet sulfonyl chloride filter cake slurried in 1200 parts of ice water are added 22.5 parts of 2,4-diaminobenzenesulfonic acid, and the pH is adjusted to 7.5 with ammonium hydroxide. The mixture is heated to 40° C. and stirred at this temperature, maintaining the pH at 7.5–8.0, by addition of ammonium hydroxide until the pH remains constant, usually 3–4 hours. The resulting dye base is filtered off after acidification of the solution to pH 2 with hydrochloric acid. After washing the filter cake with dilute hydrochloric acid, the dye base, of formula,

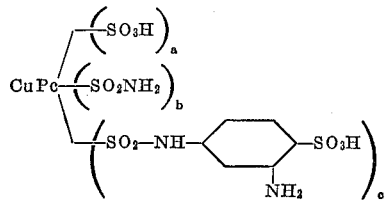

is reslurried in 1500 parts of 45° C. water at pH 7.5–8.0 using sodium hydroxide. To this solution is added with vigorous stirring at 40°–45° C. and pH 7.5–8.0 (maintained with sodium hydroxide) a solution of 21.0 parts of 2,3-dichloro-6-quinoxalinecarbonyl chloride and 45 parts of xylene. After the pH holds constant, about 4 hours, the solution is clarified and 100 parts of sodium sulfate are added. The turquoise solution is salted carefully with solid sodium chloride to about 16%, the precipitated dye is filtered, washed with a 10% sodium sulfate and 10% sodium chloride solution, and dried in an oven below 80° C. This dye mixture, of the structure

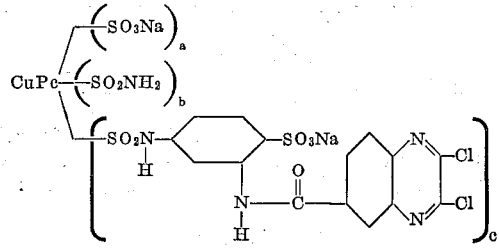

on analysis is found to contain 1.0 dichloroquinoxaline radical, 1.4 sulfamoyl radicals, and 2.5 sodium sulfonate groups. Thus, the values of $a$, $b$, and $c$ are 1.5, 1.4, and 1.0, respectively. This dye is standardized to 55% active ingredients by the addition of anhydrous sodium sulfate. When applied to cellulose textile materials by the conventional methods, a bright turquoise shade with good light and wash fastness is obtained.

When the sodium sulfate is left out of this preparation, the resulting dye must be dried below 40° C. to avoid hydrolysis of the reactive chlorines during this step.

In place of the sodium sulfate in this example, equally stable dyes can be obtained by using molar equivalent amounts of ammonium sulfate or potassium sulfate.

The class of quinoxaline fiber-reactive dyes which are stabilized according to this invention are materials which have been previously known. Such dyes are described in U.S. application Ser. No. 154,028, filed November 21, 1961. In view of the fact that the purpose of the invention is to stabilize the reactive chlorine on the quinoxaline ring, the dye bases used to supply the radical represented by the symbol D is not critical to this invention. It will be seen from the foregoing examples that quinoxaline dyes wherein D is an azo, an anthraquinone, or a copper phthalocyanine chromophore, can be stabilized according to this invention. Moreover, it is also possible to employ other dye bases in the procedure of the examples. For instance, the dye base which was used in Example I (3-amino-1,5-naphthalenedisulfonic acid→meta-toluidine) may be replaced by equimolar proportions of any of the following dye bases:

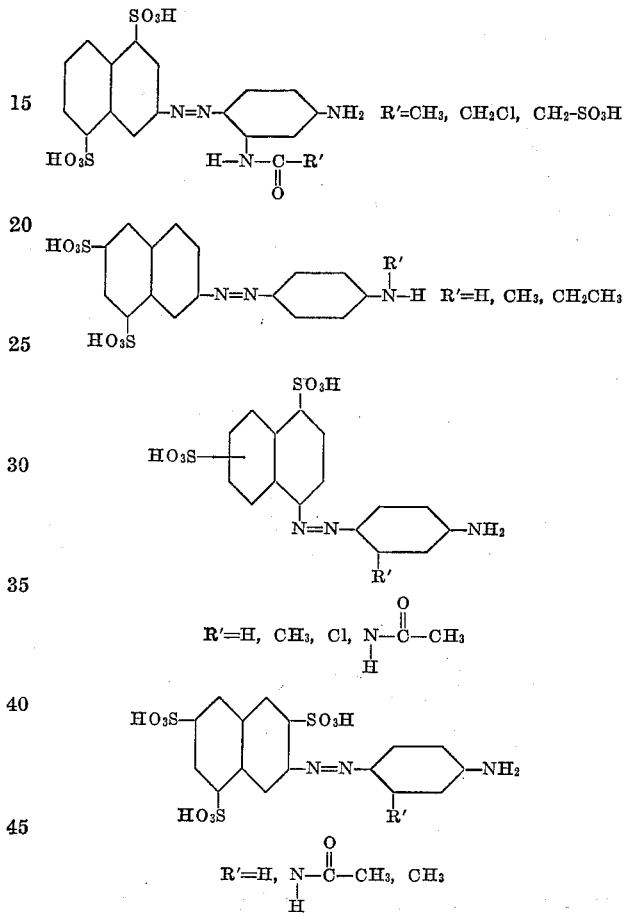

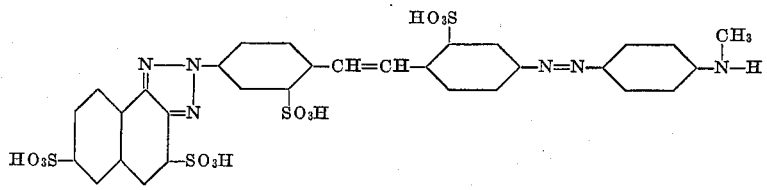

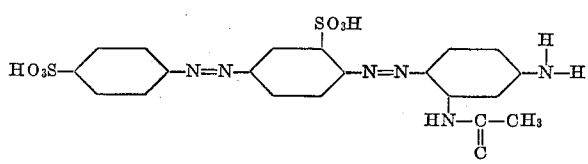

It should be further pointed out that one skilled in the art can also replace the dye bases of any of the examples with equimolar proportions of dye bases which are similar to those used in the specific examples. In Example II, one or more of the following substitutions can be made. If desired, the dye used in this example can contain a monochloro-6-quinoxaline group by using equimolar portions of 2- or 3-chloro-6-quinoxalinecarbonyl chloride instead of the 2,3-dichloro derivative which was used in Example II. Also, the dye can be prepared by using 2,5-diaminobenzene-sulfonic acid instead of the 2,4 isomer which is specified in Example II. Moreover, in place of the pyrazalone which was used to prepare the dye of Example II, one could use the following compounds:

(1)
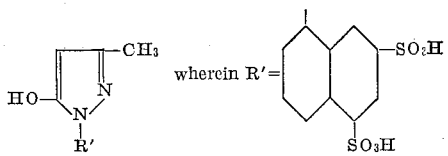

(2)
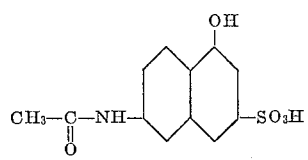

In Example III, the following dye bases may be substituted for the dye base which was used therein;

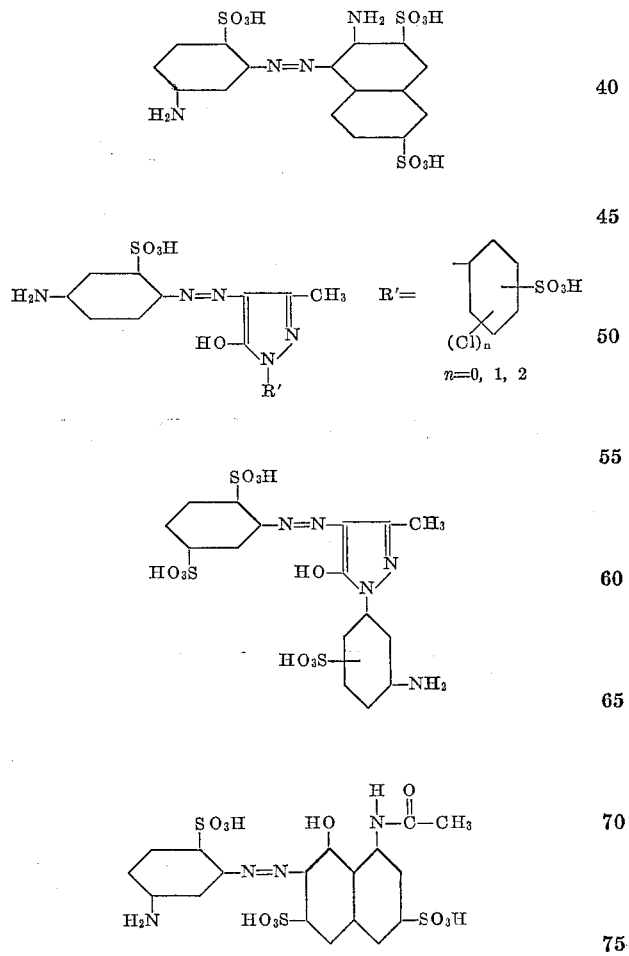

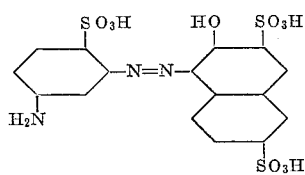

In Example IV, either the coupler or the diazo component or both may be changed. For instance, the 8-amino-1-naphthol-3,6-disulfonic acid used in Example IV may be replaced with equimolar amounts of

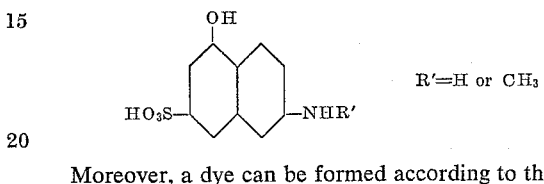

Moreover, a dye can be formed according to the procedure of Example IV if the orthanilic acid is replaced with equimolar amounts of

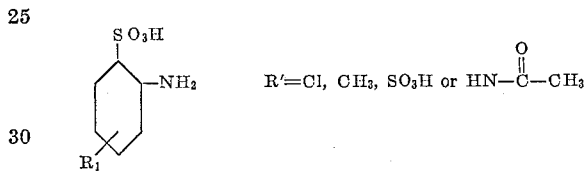

One skilled in the art also realizes that the 2- or 3-monochloro-6-quinoxalinecarbonyl chloride can be substituted for the dichloro isomer in any of the dyes which can be made in accordance with Example IV.

In Example V, the dye base is formed by coupling acetyl H acid (8-amino-1-naphthol-3,6-disulfonic acid) with orthanilic acid. In place of this dye base, one can use equimolar proportions of the folowing dye bases:

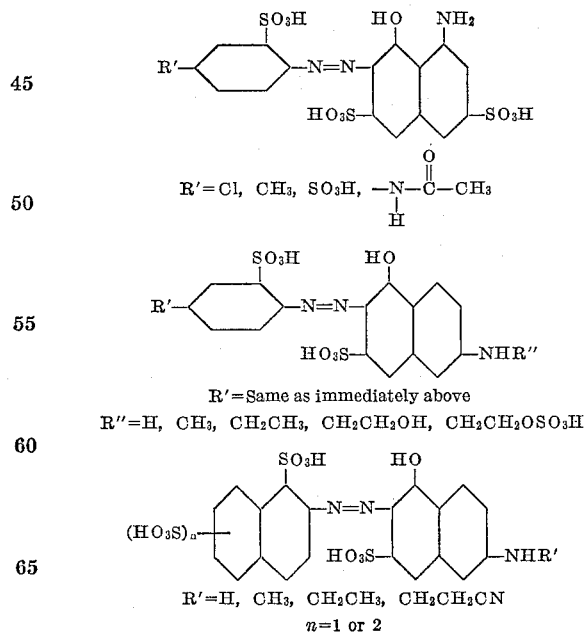

Example VI shows a quinoxaline dye in which the dye chromophore is a radical of a metallized azo coupling product of 2-amino-1-phenol-4-sulfonic acid with 6-amino-1-naphthol-3-sulfonic acid. It is possible to substitute for this dye base equimolar parts of one or a mixture of the following metallized azo dye bases:

| Azo Dye Base | Metallized with— |
|---|---|
| (structure: HO-phenyl(HO₃S)(HO₃S)-N=N-naphthyl(HO)(HO₃S)-NHCH₃) | Cu or Co |
| (structure: HO-phenyl(HO₃S)-N=N-naphthyl(HO)(HO₃S)-NH₂ with SO₃H) | Cu or Cr |
| (structure: HO-phenyl(HO₃S)(HO₃S)-N=N-naphthyl(HO)(HO₃S)-NH₂) | Cu |
| (structure: HO-phenyl(HO₃S)(SO₃H)-N=N-pyrazole(CH₃)(HO)-N-phenyl-NH₂) | Cu |
| (structure: naphthyl(OH)(O₂N)(SO₃H)-N=N-naphthyl(HO)(HO₃S)-NHR'); R'=H, CH₂CH₃, CH₂CH₂CN | Cu |
| (structure: Cl-phenyl(HO₃S)-N=N-phenyl(OH)(H₃C)-N=N-naphthyl(HO)(HO₃S)-NH₂ with SO₃H) | Cu or Co or Cr |
| (structure: H₂N-phenyl(HO)(HO₃S)-N=N-pyrazole(CH₃)(HO)-N-phenyl(Cl)(HO₃S)) | Cu |
| (structure: naphthyl(NH₂)(OH)(SO₃H)-N=N-naphthyl(HO)(NH₂)(HO₃S)(SO₃H)-SO₃H) | Cu |

Example VII has been presented to show the use of the sulfate ion to stabilize a quinoxaline fiber-reactive dye which has been prepared from an anthraquinone dye base. Substitutions can also be made for the anthraquinone dye base of Example VII. The following anthraquinone components and diamine components can be condensed interchangeably to form dye bases which may be used in place of the dye base which is specified in Example VII:

both the monochloro- and dichloro-6-quinoxalinecarbonyl chloride. In many of the examples, it has been stated that the monochloro derivative may be substituted for the dichloro derivative or vice versa. Moreover, it should be understood that in any of the specific examples previously set forth, one may use either 2,3-dichloro-6-quinoxalinecarbonyl chloride, 2-chloro-6-quinoxalinecarbonyl chloride, or 3-chloro-6-quinoxalinecarbonyl chloride, or combinations of these carbonyl chlorides.

| Anthraquinone Component | Diamine Component | |
|---|---|---|
| (structure) | (structure) | R'=H, CH₃, CH₂CH₂OH, CH₂CH₂CN |
| (structure) | (structure) | R'=H, CH₃, CH₂CH₃, CH₂CH₂CH₃, CH₂CH₂OH, CHCH₃\|CH₃ |
| (structure) | (structure) | R'=H, CH₃, CH₂CH₂OH, CH₂CH₂CN |
| (structure) | (structure) | |
| (structure) | (structure) | R'=CH₃, Cl, H |

The use of a phthalocyanine dye base has been illustrated in Example VIII. Typical phthalocyanine dye bases which are useful in this example are prepared by reacting a metal phthalocyanine tri- or tetrasulfonyl chloride wherein the sulfo groups are in the 3, 4 or 3 and 4 positions and the metal is Cu, Ni, or Co, with a diamine in the presence of a monoamine. The diamine used most frequently is

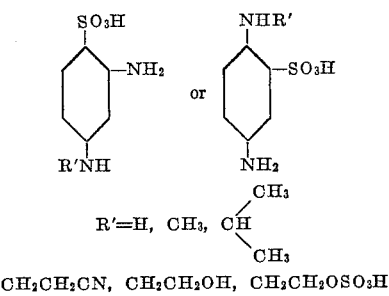

R'=H, CH₃, CH<CH₃ / CH₃

CH₂CH₂CN, CH₂CH₂OH, CH₂CH₂OSO₃H

Ammonia is the preferred monoamine, but other amines such as methylamine and β-hydroxyethylamine are also useful.

The examples disclose preparation of dye bases using

It has been previously mentioned that the sulfate ion will stabilize dye compositions which are on the alkaline side, that is, having a pH up to about 8.5 when the dye composition is slurried or dissolved in 10 parts by weight of water. The invention is effective at this higher pH since under mildly alkaline conditions, sufficient hydrolysis will occur at a reasonable rate to produce HCl which in turn lowers the pH sufficiently to allow the sulfate ion to become effective.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A fiber-reactive dye composition comprising fiber-reactive dye solids having the formula

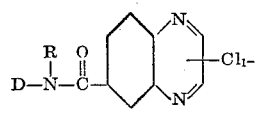

where D is a water-soluble dye chromophore selected from the group consisting of azo, metallized azo, anthraquinone, and phthalocyanine dye chromophores which is attached to the N-atom by cyclic substitution, and R is selected from the group consisting of hydrogen, lower alkyl, 2-hydroxyethyl, 2-cyanoethyl, and 2-sulfatoethyl, and as a stabilizer against hydrolysis of said dye solids a sulfate salt selected from the group consisting of alkali metal and ammonium sulfates in an amount sufficient to provide at least 3% of sulfate ions based on the weight of dye solids.

2. The fiber-reactive dye composition of claim 1 wherein the alkali metal sulfate is sodium sulfate.

3. The fiber-reactive dye composition of claim 1 wherein sufficient water is present to form a dye paste.

4. The fiber-reactive dye composition of claim 1 in the form of a free-flowing powder.

5. In the manufacture of a fiber-reactive dye having the formula

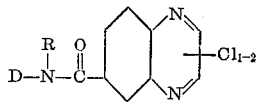

where D is a water-soluble dye chromophore selected from the group consisting of azo, metallized azo, anthraquinone, and phthalocyanine dye chromophores which is attached to the N-atom by cyclic substitution, and R is selected from the group consisting of hydrogen, lower alkyl, 2-hydroxyethyl, 2-cyanoethyl, and 2-sulfatoethyl, wherein the dye is salted out of an aqueous medium and removed from the aqueous medium and dried, the improvement which comprises adjusting the pH of the aqueous medium to about 4–8.5 prior to the separation of the dye from the aqueous medium, and drying the separated dye solids in the presence of a sulfate selected from the group consisting of alkali metal and ammonium sulfates in an amount sufficient to provide at least 3% of sulfate ion based on the weight of dye solids.

6. The process of claim 5 wherein the pH of the aqueous medium is adjusted to about 5.5–8 and the alkali metal sulfate is sodium sulfate.

7. A fiber-reactive dye composition comprising the dye of formula

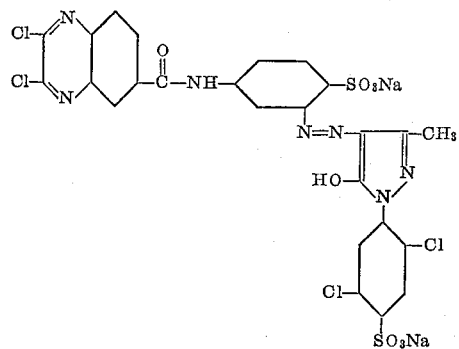

and at least 3% by weight thereof of sulfate ions as sodium sulfate.

8. A fiber-reactive dye composition comprising the dye of formula

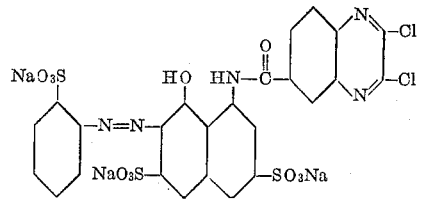

and at least 3% by weight thereof of sulfate ions as sodium sulfate.

9. A fiber-reactive dye composition comprising the dye of formula

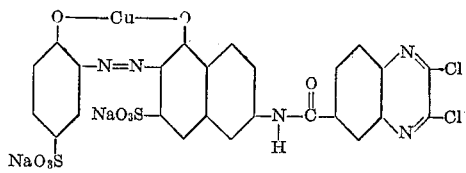

and at least 3% by weight thereof of sulfate ions as sodium sulfate.

10. A fiber-reactive dye composition comprising the dye of formula

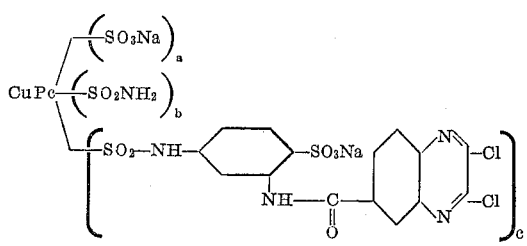

wherein the values of $a$, $b$, and $c$ are about 1.5, 1.4, and 1.0, respectively, and at least 3% by weight thereof of sulfate ions as sodium sulfate.

11. A fiber-reactive dye composition comprising the dye of formula

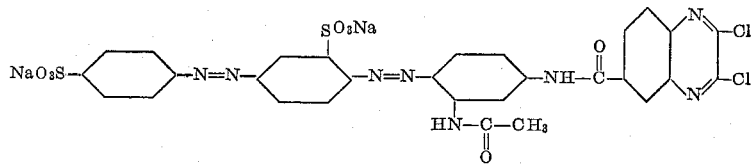

and at least 3% by weight thereof of sulfate ions as sodium sulfate.

References Cited by the Examiner

UNITED STATES PATENTS

| | | | |
|---|---|---|---|
| 2,768,171 | 10/1956 | Clarke et al. | 260—314.5 |
| 3,036,058 | 5/1962 | Andrew et al. | 260—153 X |
| 3,038,893 | 6/1962 | Andrew et al. | 260—153 X |

FOREIGN PATENTS

| | | |
|---|---|---|
| 638,567 | 3/1962 | Canada. |
| 315,451 | 7/1929 | Great Britain. |

CHARLES B. PARKER, *Primary Examiner.*

DONALD M. PAPUGA, *Examiner.*

REYNOLD J. FINNEGAN, *Assistant Examiner.*

UNITED STATES PATENT OFFICE
CERTIFICATE OF CORRECTION

Patent No. 3,313,797                                             April 11, 1967

Erik Kissa

It is hereby certified that error appears in the above numbered patent requiring correction and that the said Letters Patent should read as corrected below.

Column 16, lines 71 to 75, the formula should appear as shown below instead of as in the patent:

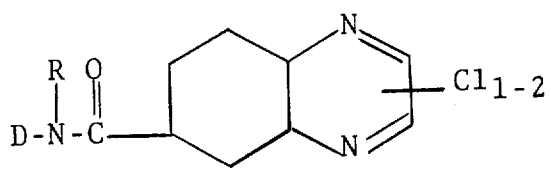

Signed and sealed this 7th day of November 1967.

(SEAL)
Attest:

EDWARD M. FLETCHER, JR.                          EDWARD J. BRENNER
Attesting Officer                                Commissioner of Patents